United States Patent [19]

Shepherd

[11] Patent Number: 4,718,399
[45] Date of Patent: Jan. 12, 1988

[54] BARBEQUE WAGON

[75] Inventor: Charles G. Shepherd, Oakville, Canada

[73] Assignee: B. D. Wait Co. Limited, Oakville, Canada

[21] Appl. No.: 855,667

[22] Filed: Apr. 25, 1986

[30] Foreign Application Priority Data

Apr. 26, 1986 [CA] Canada .................................. 480248

[51] Int. Cl.⁴ .............................................. A47J 37/07
[52] U.S. Cl. .................................. 126/25 R; 126/9 B; 126/268
[58] Field of Search ................... 126/41 R, 9 B, 25 R, 126/25 A, 268, 276, 277, 39 B

[56] References Cited

U.S. PATENT DOCUMENTS

| | | | |
|---|---|---|---|
| 479,652 | 7/1892 | Marcee | 126/9 B |
| 2,274,433 | 2/1942 | Schulz | 126/39 B |
| 2,511,594 | 6/1950 | Loffredo | 126/9 B |
| 2,600,234 | 6/1952 | Foley | 126/268 |
| 2,666,425 | 1/1954 | Hasting, Jr. | 126/268 |
| 2,666,426 | 1/1954 | Pollard | 126/276 |
| 2,787,995 | 4/1957 | Alter | 126/9 B |
| 3,003,494 | 10/1961 | Ross et al. | 126/9 R |
| 3,091,170 | 5/1963 | Wilson | 126/25 A |
| 3,285,239 | 11/1966 | Drake | 126/25 A |
| 3,289,801 | 12/1966 | Jerkins | 126/41 R |
| 3,348,471 | 10/1967 | Lackenbauer et al. | 126/25 A |
| 3,391,682 | 7/1968 | King et al. | 126/25 R |
| 3,789,822 | 2/1974 | Schantz | 126/41 R |
| 4,086,849 | 5/1978 | Simmons | 126/276 |
| 4,210,118 | 7/1980 | Davis et al. | 126/9 B |
| 4,337,751 | 7/1982 | Sampson et al. | 126/9 B |
| 4,356,988 | 1/1982 | McIntosh | 126/41 R |
| 4,364,310 | 12/1982 | Rufkahr | 126/276 |

FOREIGN PATENT DOCUMENTS

| | | | |
|---|---|---|---|
| 825371 | 3/1938 | France | 126/268 |
| 2299840 | 9/1976 | France | 126/41 R |
| 2502212 | 9/1982 | France | 126/277 |
| 411675 | 6/1934 | United Kingdom | 126/268 |

Primary Examiner—Samuel Scott
Assistant Examiner—H. A. Odar
Attorney, Agent, or Firm—Rogers & Scott

[57] ABSTRACT

The invention provides an adjustable wagon for supporting a range of sizes of barbeques, the wagon includes a base and first and second end structures for attachment to the base at selected locations to extend upwardly in parallel from the base. The end structures can be spaced selected distances from one another according to the size of barbeque to be supported, and they include supports for receiving the barbeque between the end structures so that the barbeque becomes a structural element of the total assembly.

5 Claims, 5 Drawing Figures

BARBEQUE WAGON

This invention relates to wagons for use in supporting barbeques such as gas barbeques, so that a barbeque can be moved between a location where it is to be used and a storage location. More particularly this invention relates to an adjustable wagon capable of assembly with a variety of barbeques of different sizes.

Better quality barbeques consist of a lower housing for containing a grill which is heated by mediums such as charcoal or gas-fired burners, and a lid to cover the grill and to contain the heat. Because such barbeques are made up of castings, they can be quite heavy and it has become common to support the barbeque on a wagon having two wheels at one end of the wagon so that the user can lift the other end of the wagon to wheel the barbeque between a location where it is being used and a storage location. The wagon has to be robust because of the weight of the barbeque and also because of its high centre of gravity. Commonly the user will keep the barbeque assembly in a garage or other covered place and move it to an outdoor patio for use.

The general arrangement of existing barbeque wagons includes a base, which can be used to support a pressurized container of fuel, and pairs of uprights carrying a horizontal upper structure for supporting the barbeque. Provision is made to grip the wagon at the ends of extensions of the upper structures, and shelves are often supported on the extensions to provide places to put plates, etc. Sometimes a front shelf is provided which can be pivoted downwardly to permit better access to the barbeque for maintenance and storage. Because of the nature of the barbeque, the wagon must be stable and resist forces tending to upset it.

The shelves are typically of wood and they are usually attached permanently. If the barbeque is stored outdoors, the shelves will tend to deteriorate, particularly in winter months.

Barbeque wagons are supplied to purchasers in a knock-down condition to minimize storage requirements during transportation between the manufacturer and the purchaser. Wagons are made in a variety of sizes to fit individual barbeques and assembly is done by the purchaser. It is therefore desirable to provide a simple structure which can be assembled using a minimum of tools and using simple assembly techniques. Of course the resulting structure must have adequate strength and stability.

The foregoing considerations also lead to the need for a wagon which is not only simple to assemble, but is also capable of assembly with different sizes of barbeques. Also it would be advantageous to provide a removable front shelf as well as removable bottom and side shelves so that these parts can be stored inside the house during the winter without having to take the complete barbeque and wagon indoors.

Accordingly, the invention provides an adjustable wagon for supporting a range of sizes of barbeques, the wagon includes a base and first and second end structures for attachment to the base at selected locations to extend upwardly in parallel from the base. The end structures can be spaced selected distances from one another according to the size of barbeque to be supported, and they include supports for receiving the barbeque between the end structures so that the barbeque becomes a structural element of the final assembly.

The invention will be better understood with reference to the drawings in which.

Figure 1:
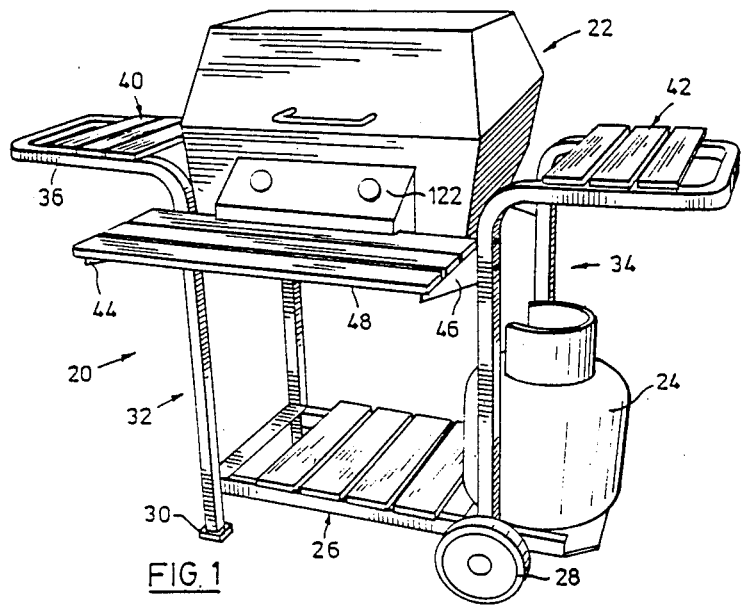
FIG. 1 is a perspective view of an adjustable wagon according to a preferred embodiment of the invention and assembled with an exemplary barbeque.

Reference is made first to FIG. 1 which illustrates a preferred embodiment of an adjustable wagon 20 supporting an exemplary gas-fired barbeque 22 which receives fuel from a container 24 of pressurized fuel. The connections between the container 24 and the barbeque are not shown in order to simplify the drawing.

The wagon 20 consists essentially of a base 26 supported under the container 24 by a pair of wheels 28 (one of which can be seen), and at the other end by a pair of feet 30. These feet form part of a first end structure 32 which extends upwardly from the feet in a generally parallel arrangement with a second end structure 34. These structures terminate respectively in outwardly extending handles 36, 38 which in turn support side shelves 40, 42.

As will be described, the barbeque 22 is attached to the end structures as a structural element and a pair of forwardly extending brackets 44, 46 are attached to the respective first and second end structures to support a front shelf 48. This shelf can be moved between the horizontal position shown in FIG. 1 and a hanging position as will be described with reference to FIGS. 3 and 4.

Figure 2:
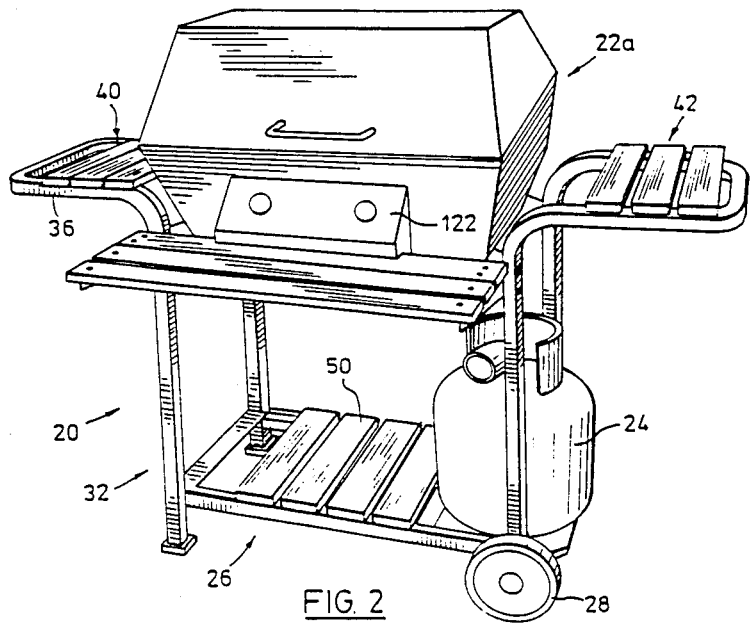
FIG. 2 is a view similar to FIG. 1 and showing the adjustable wagon assembled with a larger exemplary barbeque.

As also seen in FIG. 1, the base projects beyond the second end structure with the container 24 supported generally below the side shelf 42. This is the arrangement that would be used for a smaller barbeque 22. A larger barbeque can be accommodated (as will be described) and the overall view will then be somewhat like FIG. 2. Here it will be seen that the container 24 remains in the same location relative to the base 26 but the wheels 28 and end structure 34 are spaced further from the end structure 32 to accommodate a larger barbeque 22. This view is included purely to make a comparison between the arrangement when a smaller barbeque is used and that used with a larger barbeque. One difference shown in these views is not essential and that is that the front shelf is of different lengths. Evidently (and as will be described more fully) the shelf could be provided with sets of holes so that the same shelf could be attached to the brackets 44, 46 with the brackets spaced from one another at a variety of distances.

Figure 3:
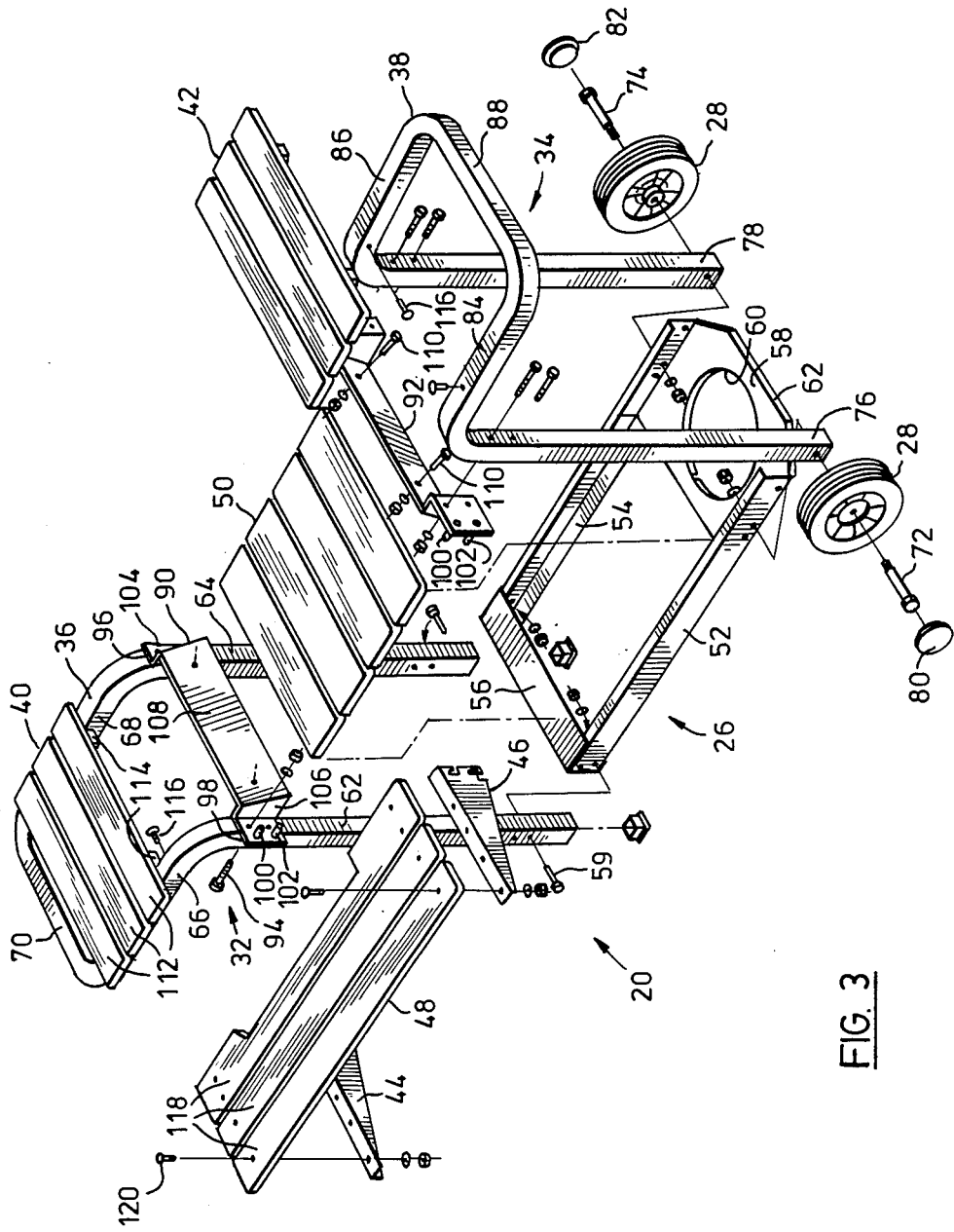
FIG. 3 is an exploded perspective view of the adjustable wagon including how it would be assembled in the FIG. 1 arrangement.

Reference is next made to FIG. 3 to describe the wagon 20 in more detail. The base 26 (with the shelf 50 removed) is shown removed from the end structures 32, 34. The base is of sheet metal having a pair of side members 52, 54 extending between an end piece 56 and a tray 58 which supports the container (FIG. 1). As seen in FIG. 3 the tray has an opening 60 shaped to receive the bottom of the container for stability and the exposed end of the tray is reinforced by a downwardly projecting lip arranged this way to minimize interference with the container when the container is being replaced.

Openings are provided in the base side members 52, 54 at the end adjacent the piece 56 to receive pairs of fasteners 59 (one of which is seen) to attach respective legs 62, 64 of the first end structure 32 to the outer sides of these side members. These legs extend upwardly and parallel and curve outwardly terminating in the side handle 36 which is made up of a pair of outwardly extending parts 66, 68 which extend to a hand rail 70. The legs 62, 64, parts 66, 68 and rail 70 are formed from a continuous section of square tubing.

The end of the base adjacent the container-supporting tray 58 has holes in the side members 52, 54 in groups corresponding to different sizes of barbeques as will be described. The structure shown in FIG. 3 is to be assembled using the middle of 3 holes using axles 72, 74 which extend through respective wheels 28 and are fastened both to legs 76, 78 and to the side members 52, 54. After the wheels are assembled, caps 80, 82 may be snapped over the outer ends of the axles to improve the appearance of the wheels. The legs 76, 78 of the second end structure 34 extend upwardly parallel both to one another and also to the legs 62, 64 of the first end structure 36. This end structure is essentially a mirror image of the end structure 32 and includes outwardly extending parts 84, 86 terminating in a hand rail 88.

Considering the structure thus far, it will be evident that the pairs of fasteners 59 cause the first end structure to be attached rigidly to the base 26 while maintaining the angular relationship between these parts. By contrast the end structure 34 is attached using a pair of aligned axles 72, 74 which of course will not prevent angular movement of the structure 34 with respect to the base. The relationship between the parts is maintained by making the barbeque a structural element. This is done by attaching the barbeque 22 via a pair of allochiral brackets 90, 92 which are attached by pairs of fasteners 94 to the respective pairs of legs 62, 64 and 76, 78.

The bracket 90 is typical of both brackets and consists of an end flange 96 in contact with the leg 64 and through which fasteners 94 pass. At its other end a wider flange 98 both receives the fasteners 94 and projects outwardly beyond the legs 62 to carry a pair of inwardly facing pins 100, 102. These pins support the bracket 44 as will be described later. The flanges 96, 98 terminate in respective inwardly extending steps 104, 106 which terminate at an inclined panel 108 having openings to receive fasteners 110 (shown adjacent bracket 92) which are used to attach directly to the barbeque 22 (FIG. 1). The barbeque is then a structural element in the assembly and maintains fixed relationship between the end structures.

The shelves 40, 42 and 50 are of similar construction. Exemplary shelf 40 consists of three slats 112 in parallel and attached to a pair of underlying stringers 114 which are spaced apart to fit snugly between the outwardly extending parts 66, 68 of the side handles 36. Set screws 116, are engaged in the inside of the parts 66, 86 to prevent the shelves sliding towards the hot barbeque. As mentioned, the shelf 42 is similar to the shelf 40 and the bottom shelf 50 is of similar construction using one more slat and longer stringers. The spacing between the stringers on the bottom shelf 50 is of course made to match the space provided between the side members 52, 54 of the base 26.

Turning now to the shelf 48, this consists of three slats 118 attached directly to the brackets 44, 46 by fasteners 120. As will be described with reference to FIGS. 4 and 5, the shelf 48 is suspended from the pins 100, 102 on the respective allochiral brackets 90, 92. The inner one of the slats 118 is recessed to fit around a control panel 122 shown in FIG. 1. As mentioned earlier, these slats can be drilled to accommodate screws in a variety of positions depending on the width of the barbeque being assembled. Alternatively, the upper flanges of the brackets can be made wider to accommodate openings for receiving fixed slats in a variety of positions, again depending on the width of the barbeque.

Figure 4:
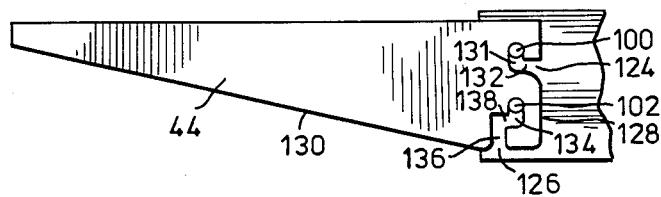
FIGS. 4 and 5 show details of the front shelf of the wagon showing how the shelf is attached and removed from the wagon.
Figure 5:
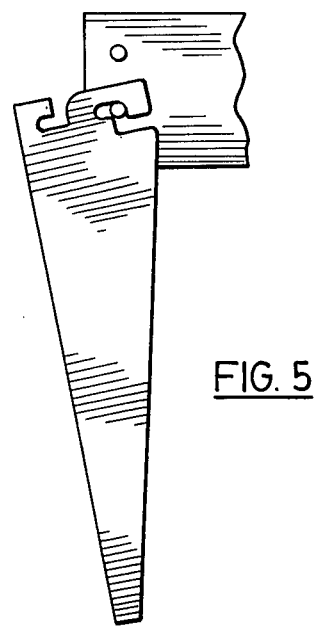

As seen in FIG. 4, the bracket 44 is supported on pins 100, 102 with the pins located in respective recesses 124, 126. The recess 124 opens from an inner end 128 of the bracket, whereas the recess 126 opens from the underside 130 of the bracket. It will be seen from FIG. 4 that the recess 124 includes an inner upright portion 131 leading upwardly from an outwardly extending portion 132. Recess 126 includes two upright portions 134, 136 connected by an outwardly extending portion 138. It will be evident also from FIG. 4 that the portions 131, 134 are proportioned so that if the bracket is lifted vertically, the pins will then be aligned for movement with the respective portions 132 and 138. The pin 100 is then in alignment with the portion 132 whereas the pin 102 is at the junction of the portions 134, 138. Bracket 44 can then be rotated downwardly because the pin 100 can escape and the pin 102 acts as a fulcrum for this movement. Continued downward movement will bring it into the position shown in FIG. 5 where it is securely supported with the front shelf 48 (FIG. 1) in an inclined position. If it is then intended to remove the shelf from the wagon, the bracket shown in the FIG. 5 position can be lifted vertically so that the pin moves to the forward extremity of the portion 138 and the bracket can then be moved outwardly (i.e., to the left as drawn in FIG. 5) because the pin is free to travel down portion 136 and escape from the recess 126. Reversing this procedure will allow reassembly of the shelf into the FIG. 4 position.

I claim:

1. An adjustable wagon for supporting a range of sizes of barbeques of the kind having a container with a cover adapted to close the container, a grill supported within the container, and heat-generating means located in the container beneath the grill, the wagon comprising:

a wheeled base;

first and second end structures for attachment to the base to extend upwardly from the base with the end structures spaced from one another selectively according to the width of barbeque to be supported;

connecting means coupling the end structures to the base and including adjustment means for selecting the position of at least one end structure relative to the base;

support means coupled to the end structures for receiving the barbeque between the end structures; and means attaching the barbeque to the support means.

2. An adjustable wagon for supporting a range of sizes of barbeques of the kind having a container with a cover adapted to close the container, a grill supported within the container, and heat-generating means located in the container beneath the grill, the wagon comprising:

a wheeled base;

first and second end structures for attachment to the base to extend upwardly from the base with the end structures spaced from one another selectively according to the width of barbeque to be supported;

connecting means coupling the end structures to the base and including adjustment means for selecting the position of at least one end structure relative to the base;

support means coupled to the end structures for receiving the barbeque between the end structures; and means attaching the barbeque to the support means; the end structures including shelf support portions extending outwardly at top ends of the end structures remote from the base, and shelves removably supported by the shelf support portions.

3. An adjustable wagon for supporting a range of sizes of barbeques of the kind having a container with a cover adapted to close the container, a grill supported within the container, and heat-generating means located in the container beneath the grill, the wagon comprising:

a wheeled base;

first and second end structures for attachment to the base to extend upwardly from the base with the end structures spaced from one another selectively according to the width of barbeque to be supported;

connecting means coupling the end structures to the base and including adjustment means for selecting the position of at least one end structure relative to the base;

support means coupled to the end structures for receiving the barbeque between the end structures; and means attaching the barbeque to the support means; the base including storage means for supporting a pressurized gas container for use as a source of fuel for heating the barbeque.

4. An adjustable wagon for supporting a range of sizes of barbeque of the kind having a container with a cover adapted to close the container, a grill supported within the container, and heat-generating means located in the container beneath the grill, the wagon comprising:

a wheeled base;

first and second end structures for attachment to the base to extend upwardly from the base with the end structures spaced from one another selectively according to the width of barbeque to be supported;

connecting means coupling the end structures to the base and including adjustment means for selecting the position of at least one end structure relative to the base;

support means coupled to the end structures for receiving the barbeque between the end structures; and means attaching the barbeque to the support means; the end structures including bracket support means and a front shelf operably attached to a pair of mounting brackets co-operatively engaged with said support means for movement of the front shelf between a horizontal and a hanging position.

5. An adjustable wagon as claimed in claim 4 in which the front shelf is releasable from the bracket support means in the hanging position.

* * * * *